United States Patent
James

(10) Patent No.: US 10,223,006 B2
(45) Date of Patent: Mar. 5, 2019

(54) DATA MANAGEMENT SYSTEM

(71) Applicant: EZUNIVERSE INC., Mahwah, NJ (US)

(72) Inventor: Leszek James, Mahwah, NJ (US)

(73) Assignee: DRIVE THRU TECHNOLOGY INC., Framingham, MA (US)

( * ) Notice: Subject to any disclaimer, the term of this patent is extended or adjusted under 35 U.S.C. 154(b) by 57 days.

(21) Appl. No.: 15/515,276

(22) PCT Filed: Oct. 5, 2015

(86) PCT No.: PCT/US2015/054023
§ 371 (c)(1),
(2) Date: Mar. 29, 2017

(87) PCT Pub. No.: WO2016/054640
PCT Pub. Date: Apr. 7, 2016

(65) Prior Publication Data
US 2017/0220270 A1    Aug. 3, 2017

Related U.S. Application Data

(60) Provisional application No. 62/059,419, filed on Oct. 3, 2014.

(51) Int. Cl.
*G06F 12/00* (2006.01)
*G06F 3/06* (2006.01)
(Continued)

(52) U.S. Cl.
CPC .......... *G06F 3/0616* (2013.01); *G06F 3/0604* (2013.01); *G06F 3/0613* (2013.01); *G06F 3/0649* (2013.01); *G06F 3/0652* (2013.01); *G06F 3/0656* (2013.01); *G06F 3/0659* (2013.01); *G06F 3/0676* (2013.01);
(Continued)

(58) Field of Classification Search
None
See application file for complete search history.

(56) References Cited

U.S. PATENT DOCUMENTS 6,661,792 B1 * 12/2003 Park .................... H04L 47/2441
370/392
7,764,717 B1 *  7/2010 Yu ....................... H04L 43/0894
370/537
(Continued)

FOREIGN PATENT DOCUMENTS

EP    1 594 064 A2    11/2005
EP    2 418 584 A1     2/2012

OTHER PUBLICATIONS

International Search Report and Written Opinion dated Jan. 12, 2016, from the corresponding PCT/US2015/054023.

*Primary Examiner* — John A Lane
(74) *Attorney, Agent, or Firm* — Katten Muchin Rosenman LLP

(57) ABSTRACT

Disclosed herein is a data management system for storing a plurality of incoming data streams. The data management system utilizes a high speed storage device in combination with an intelligent FIFO process to reliably store the incoming data streams to a storage device without fragmentation. The data management system further includes one or more external storage devices that can be used for archival purposes.

17 Claims, 2 Drawing Sheets

(51) Int. Cl.
*G06F 13/38* (2006.01)
*H04N 7/18* (2006.01)
*G06F 5/06* (2006.01)

(52) U.S. Cl.
CPC .......... *G06F 3/0683* (2013.01); *G06F 3/0688* (2013.01); *G06F 5/065* (2013.01); *G06F 13/382* (2013.01); *H04N 7/181* (2013.01); *G06F 2205/067* (2013.01)

(56) References Cited

U.S. PATENT DOCUMENTS

| | | | |
|---|---|---|---|
| 2002/0124129 A1* | 9/2002 | Zilberman | G06F 13/1673 711/103 |
| 2005/0163226 A1* | 7/2005 | Chung | H04N 21/23406 375/240.25 |
| 2010/0005205 A1* | 1/2010 | Brune | G06F 13/4031 710/105 |
| 2010/0088463 A1* | 4/2010 | Im | G06F 12/0246 711/103 |
| 2010/0319689 A1* | 12/2010 | Kwok | A61M 16/0057 128/202.13 |
| 2011/0255543 A1* | 10/2011 | Zhi | G06F 15/17325 370/394 |
| 2012/0290785 A1 | 11/2012 | Ergan et al. | |
| 2013/0132620 A1* | 5/2013 | de Goede | G06F 13/105 710/53 |
| 2013/0138875 A1 | 5/2013 | Kamphenkel et al. | |
| 2014/0297944 A1 | 10/2014 | Abe | |

* cited by examiner

DATA MANAGEMENT SYSTEM

FIELD OF THE INVENTION

The present invention relates to data management and, more particularly, to a system of optimizing and managing and storing a plurality of incoming data streams in an efficient and cost-effective manner.

BACKGROUND OF THE INVENTION

Current data management systems for storing incoming data streams typically interface to at least one internal hard drive through a SATA (Serial AT Attachment) or a SAS (Serial Attached SCSI) connection. Typically, due to the large capacity and data throughput requirements, the hard drives employed in these systems are high capacity mechanical hard disk drives (HDD). As a result, current technology for capturing multiple incoming data streams limits the life cycle of HDD and their MTBF (Mean Time Between Failures) and requires constant repairs because the HDDs are prone to wear out or break due to the 24/7 high demands of the video recording system. Further, the incoming data is typically stored in a random access manner negatively affecting data recording speed and creates substantial fragmentation on the HDDs which further limits the speed that data can be recorded. Thus, there is a need for an inexpensive and robust data management process which can increase the life cycle, reliability of the data (via redundant buffers) and the amount of data and number of separate streams the equipment employed can process at the same time.

SUMMARY

The present invention provides a data capture system generally comprising a CPU (central processing unit), high speed data bus, a high speed non-mechanical storage device optimized for speed and random access, storage device interface, and a storage device optimized for data storage size, sequential write and cost. The data capture system is also optionally coupled an external high capacity storage system optimized for data storage size, sequential write and cost, equipped with hot swappable enclosures to provide endless data storage options. An intelligent FIFO process is used to transfer data from the high speed storage device to the storage device and from the storage device to the external storage device minimizing fragmentation and optimized for data sequential writes moving data to storage devices. The data may be further optimized while moving between 3 types of devices by the business process before transfer in order to reduce the amount of data needing to be transferred.

DETAILED DESCRIPTION

Figure 1:
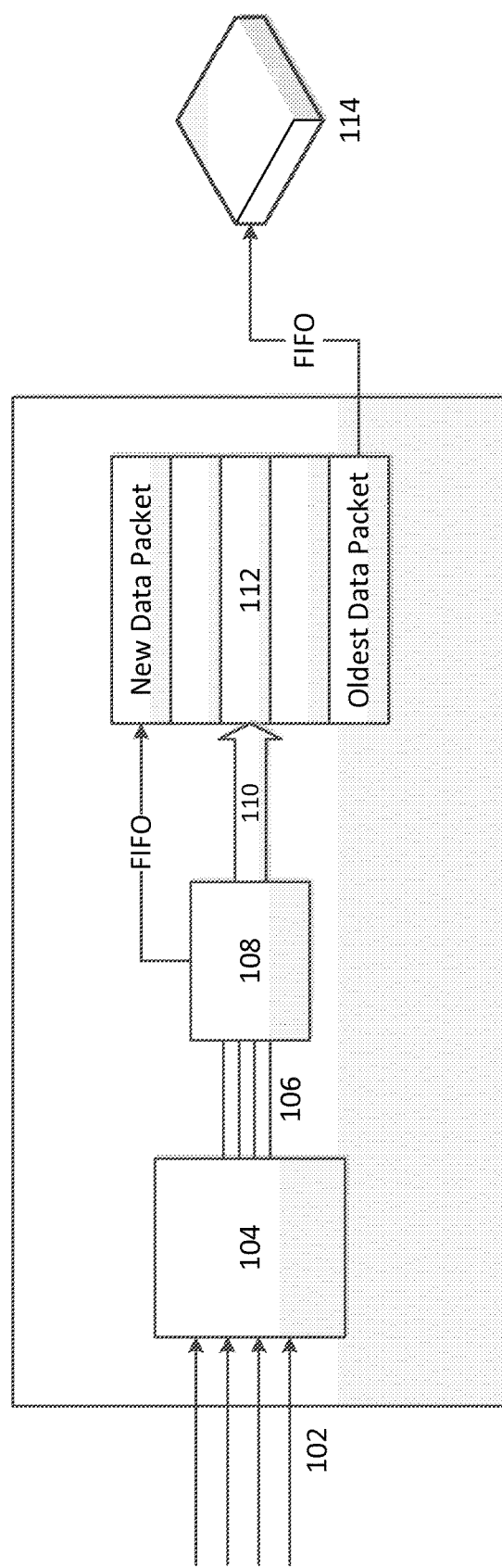
FIG. 1 depicts an exemplary embodiment of a hardware configuration of the data management system.

The following detailed description is of the best mode or modes of the invention presently in place. Such description is not intended to be understood in a limiting sense, but to be an example of the invention presented to reference in connection with the following description and the accompanying drawings one skilled in the art may be advised of the advantages and construction of the invention. In the various views of the drawings, like reference characters designate like or similar parts.

Referring now to FIG. 1, depicted is a hardware diagram of an exemplary embodiment of the present invention showing data system 100 receiving a plurality of incoming data streams 102. Preferably, data streams 102 are video data streams which are received from a video surveillance system with multiple cameras. However, it should be apparent to one skilled in the art that the data streams can be from any high output data source. Each data stream 102 generally represents the output from one source device, such as a video recording device. However, it should be apparent that each data stream 102 could also contain the combined data from multiple devices.

Data system 100 generally comprises CPU (central processing unit) 104, high speed data bus 106, high speed non-mechanical storage device 108, storage device interface 110, and storage device 112. Data system 100 is also preferably coupled to an external storage device 114. The various components of data system 100 are preferably contained in a single device, such as a desktop system. However, it should be apparent that the various components of data system 100 could be contained in multiple devices or distributed over a local area network (LAN). Data system 100 may also embody various form factors such as a laptop, a smart device, a tablet, or a smart phone.

Data system 100 may include a user interface, a display, and an input device enabling a user to interface with the user interface. Data system 100 includes a program product including a machine-readable program code for causing, when executed, data system 100 to perform programmed steps. The program product may include software which may either be loaded onto data system 100 or accessed by data system 100. The loaded software may include an application on a smart device. The loaded software may be accessed by the data system 100 using a web browser. Data system 100 may access the loaded software via the web browser using the internet, an extranet, intranet, host server, internet cloud, and the like. The loaded software may include processing software to manage the incoming data streams which will be described in detail later. The loaded software is preferably stored on high speed non-mechanical storage device 108, storage device 112, or external storage device 114.

Data streams 102 are received initially in data system 100 at CPU 104. CPU 104 packetizes the incoming data streams and forwards them as data packets to high speed non-mechanical storage device 108 over high speed data bus 106. High speed data bus 106 can be any high speed interface including, but not limited to, PCI, PCIe, mPCIe, and M.2.

High speed non-mechanical storage device 108 is preferably a solid-state drive (SSD) with a PCI Express interface. Although SSDs currently cost more than HDDs, they have several advantages. First, SSDs require less power to operate and have no moving parts. Further, the file copy and write speeds for SSDs is generally above 200 MB/s and as high as 500 MB/s for newer drives. Further, file opening on a SSD is up to 30% faster than that on a HDD. These particular advantages allow high speed non-mechanical storage device 108 to store a much higher number of incoming data streams (e.g., 50+) than a HDD is capable of (e.g., 16 Max). Further, the data can be written to the SSD with little to no fragmentation whereas constant writing to a HDD often leads to high levels of fragmentation. Further, SSDs have a PCI Express interface (32 bit) interface whereas HDDs typically have a SAS or SATA interface (1 bit). The faster interface allows for quicker transfer of data between CPU 104 and high speed non-mechanical storage device 108 over high speed data bus 106.

It should be obvious to one skilled in the art that high speed non-mechanical storage device 108 is not limited to being a SSD. Any high speed storage device, current or contemplated, can successfully be used in data system 100 as long as the advantages provided by the SSD are maintained or surpassed.

After a certain period of time, the data packets are organized and transferred to storage device 112 over storage device interface 110. Storage device interface 110 is preferably a SATA or SAS interface. This transfer is accomplished using an intelligent First-In-First-Out (FIFO) process. Generally, the intelligent FIFO process organizes the data packets on high speed non-mechanical storage device 108 into regularly sized pieces and transfers these pieces to storage device 112 as depicted in FIG. 1.

Storage device 112 is preferably a HDD having a storage capacity equal to or greater than that of high speed non-mechanical storage device 108. Because the data is moved from high speed non-mechanical storage device 108 to storage device 112 in a controlled manner using the intelligent FIFO process, fragmentation on storage device 112 is reduced or eliminated. Faster, because the data is written to storage device 112 in a controlled manner, random writes are eliminated and the speed of writes to storage device 112 is greatly increased (i.e., by up to a factor of 8× or more). The intelligent FIFO process also allows for storage device 112 to be a lower cost device, such as an HDD, than high speed non-mechanical storage device 108 (e.g., because storage device 112 does not have to accommodate random writes).

The same intelligent FIFO process is also utilized to move the oldest data packets from storage device 112 to external storage device 114. The connection to external storage device 114 from data system 100 may be any suitable connection such as a USB connection, a serial connection, a network connection, etc. Preferably, external storage device 114 is also a HDD. In some embodiments, as the newest data packet arrives at external storage device 114, the oldest existing data packet is erased to free up room. Further, in some embodiments, external storage device 114 becomes full, it may be removed for archival purposes. The external storage device 114 can then be labeled with the data contained thereon (e.g., "Contains data from Apr. 20, 2015-Apr. 27, 2015") and stored in a safe repository. Then, after a certain amount of time determined by a user, the same external storage device 114 can be reused with data system 100 after the data located thereon is no longer needed.

An advantage of data system 100 is that if high speed non-mechanical storage device 108, storage device 112, or external storage device 114 fails, there is an approximate backup of the data on the other two devices that did not fail. This is because the intelligent FIFO process is constantly transferring data between the three devices in a continuous manner. Further, data system can easily be repaired by replacing the failed component.

A further advantage of data system 100 over other current data storage devices is that the life span of storage device 112 and external storage device 114 is greatly increased (by as much as a factor of 3×). This is because data is only written to these devices using the intelligent FIFO process. That is, data is only written to these devices in large blocks at precise and known locations on the HDD. This reduces the amount that the head of the HDD needs to move during writing which greatly increases life span.

Figure 2:
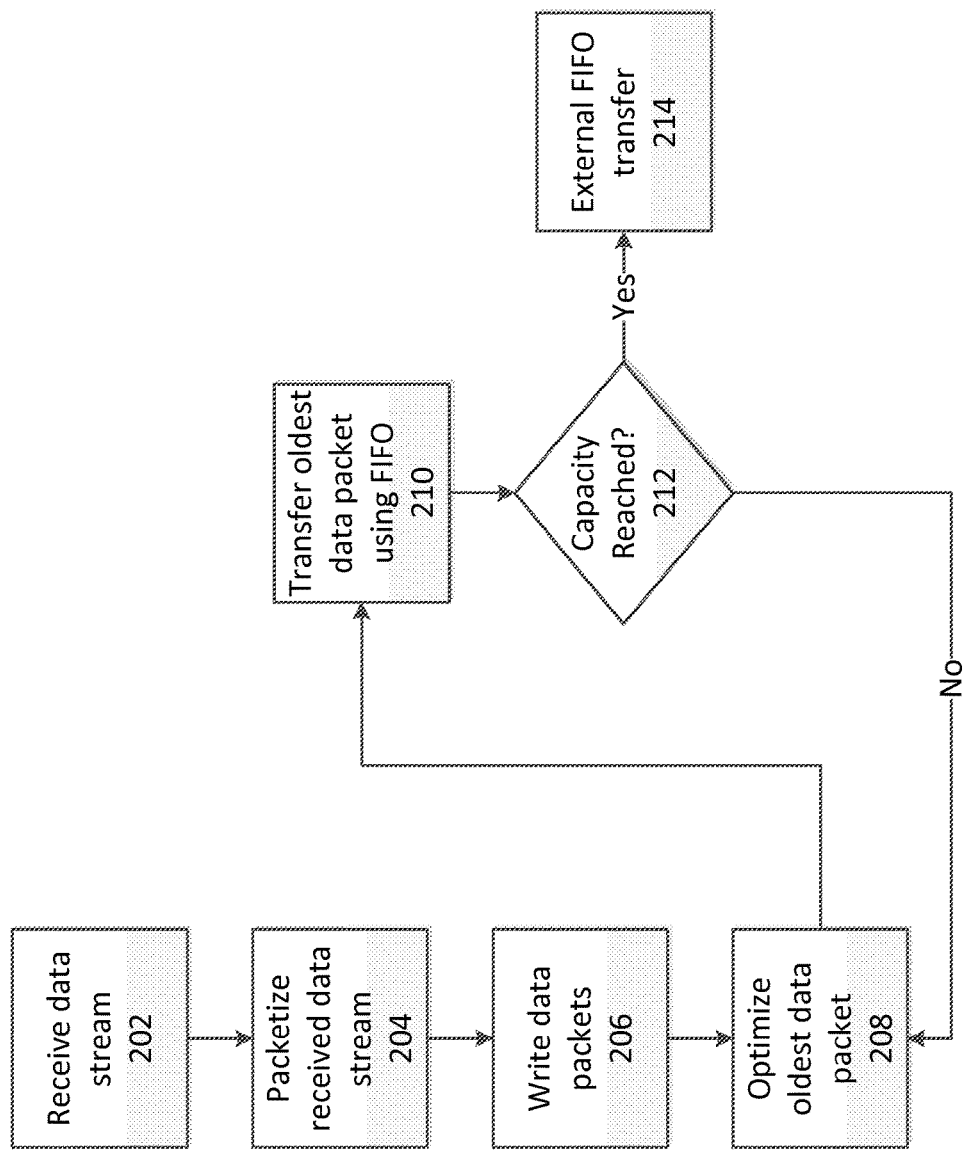
FIG. 2 depicts a flowchart showing how data is stored using the hardware configuration of FIG. 1.

Next, with reference to FIG. 2, shown in a flowchart depicting the process used from receiving data streams 102 until the eventual transfer of data to external storage 114. First, data streams 102 are received at CPU 104 at step 202. Here, the data may be further compressed (e.g., using H.264 or other methods). Next, at step 204, CPU 104 packetizes the received data streams 102 into one or more data packets. The data packets are then transferred to high speed non-mechanical storage device 108 over high speed data bus 106 in step 206. Before the data packets are transferred to storage device 112 using the intelligent FIFO process, the data packets to be transferred are optimized in step 208 according to various predefined rules.

For example, the received data streams 102, in the instance that the data streams are video streams, may contain a high resolution video and a low resolution video. In certain instances, the high resolution video is deleted to reduce the amount of data that is transferred to storage device 112. For example, the data packets may be analyzed to determine if any movement is detected in the video stream. If no movement is detected, the high resolution vide is deleted (e.g., because there is nothing in the scene). The time stamp in the video may be analyzed to determine how to process the video. For example, if the time stamp indicates that the video was taken during a predetermined range of hours (e.g., 11 PM-12 AM), only the high resolution video is transferred and the low resolution video is deleted. It should be obvious to one of ordinary skill in the art that the data packets may be optimized using various rules to reduce the amount of data that is subsequently transferred to storage device 112. HD streams could be eliminated from cameras that after specific time already lapsed do not require HD level of details (service rooms, back office). In case of an robbery incident, HD footage from all cameras may be very important.

Next, the oldest optimized data packet is transferred to storage device 112 over storage device interface 110 in step 210. This process is repeated until storage device 112 reaches a predetermined capacity (e.g., 90% full). If the capacity is reached at decision 212, transfer of data from storage device 112 to external storage device 114 begins using the intelligent FIFO process in step 214 (i.e., the oldest data packet is transferred to external storage device 114 as previously described).

In some embodiments, data system 100 may alert a user when external storage device is at or near full capacity. This allows a user to swap external storage device 114 for another device if desired. If a user does not swap out external storage device 114 after it is full, the oldest data packet is simply deleted as a new data packet is received from storage device 112.

The foregoing description and accompanying Figures illustrate the principles, preferred embodiments and modes of operation of the invention. However, the invention should not be construed as being limited to the particular embodiments discussed above. That is, additional variations of the embodiments discussed above will be appreciated by those skilled in the art. Therefore, the above described embodiments should be regarded as illustrative rather than restrictive. Accordingly, it should be appreciated that variations to those embodiments can be made by those skilled in the art without departing from the scope of the invention as defined by the following claims.

The invention claimed:

1. A data management device comprising:
a processor for receiving a plurality of video streams from a plurality of video sources,
wherein the processor packetizes the plurality of video streams into a plurality of data packets;
a first storage device for storing the plurality of data packets,
wherein the first storage device is a solid state drive (SSD)
wherein the processor transfers the plurality of data packets to the first storage device over a high speed data bus; and
a second storage device interfaced with the first storage device using a storage device interface,
wherein the second storage device is a hard disk drive (HDD);
wherein the first storage device transfers a subset of the plurality of data packets to the second storage device using a First-In-First-Out (FIFO) process continuously, and
wherein the subset of the plurality of data packets includes an oldest data packet currently located on the first storage device.

2. The data management device according to claim 1, further comprising;
an external HDD device interfaced with the data management system;
wherein the second storage device continuously transfers an oldest data packet subset currently located on the second storage device to the external HDD device using the FIFO process.

3. The data management device according to claim 2, wherein the second storage device starts the transfer to the external storage device after the second storage device has reached a predetermined capacity.

4. The data management device according to claim 3, wherein the predetermined capacity is 90%.

5. The data management device according to claim 1, wherein the first storage device deletes the subset of the plurality of data packets after the transfer to the second storage device.

6. The data management device according to claim 1, wherein each of the plurality of video streams contains a higher resolution video and a lower resolution video, and wherein the processor optimizes the subset of the plurality of data packets according to a predetermined rule before the first storage device transfer the subset to the second storage device.

7. The data management device according to claim 6, wherein the predetermined rule comprises deleting the higher resolution video from the subset so that the higher resolution video is not transferred to the second storage device.

8. The data management device according to claim 1, wherein the FIFO process writes the subset to the second storage device on continuous sectors to prevent fragmentation on the second storage device.

9. A data management process comprising:
receiving, at a data management device having a processor, a plurality of video streams from a plurality of video sources;
packetizing, using the processor, the plurality of video streams into a plurality of data packets;
storing the plurality of data packets on a first storage device using a high speed data bus;
transferring a subset of the plurality of data packets to a second storage device from the first storage device in a continuous process,
wherein the subset of the plurality of data packets always contains an oldest data packet currently stored on the first storage device,
wherein the continuous process is a First-In-First-Out (FIFO) process, and
wherein the first storage device is a solid-state drive (SSD) and the second storage device is a hard disk drive (HDD).

10. The data management process according to claim 9, further comprising:
transferring an oldest subset currently located on the second storage device to an external storage device using the FIFO process; and
deleting the oldest subset from the second storage device after the transfer.

11. The data management process according to claim 9, wherein the processor sends an alert to a user when the external storage device is full,
wherein the alert informs the user that the external storage device is at full capacity and can be swapped.

12. The data management process according to claim 9, wherein, when the external storage device is full, an oldest subset currently located on the external storage device is deleted whenever a new transfer is received from the second storage device.

13. The data management process according to claim 9, wherein the second storage device starts the transfer to the external storage device after the second storage device has reached a predetermined capacity.

14. The data management process according to claim 9, further comprising;
replacing the external storage device with an additional storage device when the external storage device is full; and
cataloging the external storage device.

15. The data management process according to claim 9, wherein the external storage device is reused as the additional storage device after a predetermined period of time.

16. The data management process according to claim 9, further comprising;
optimizing the subset according to a predetermined rule before transferring the subset to the second storage device.

17. The data management process according to claim 9, wherein the first storage device has a higher write speed than the second storage device, and wherein the second storage device has a higher capacity than the first storage device.

* * * * *